Figure 1:
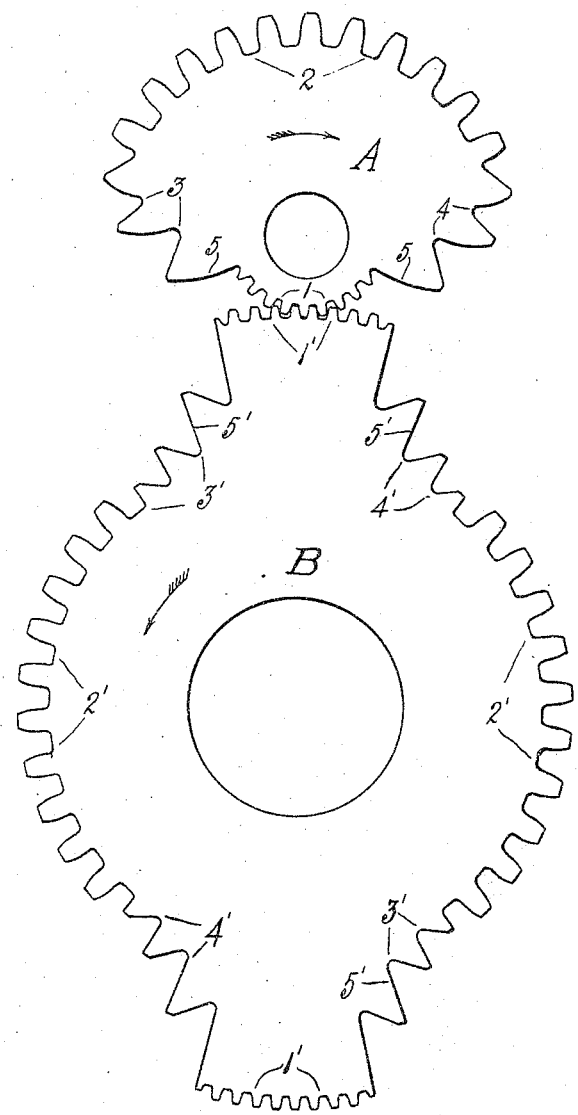

M. A. O'CONNOR.
VARIABLE SPEED GEAR.
APPLICATION FILED JUNE 20, 1910.

1,142,051.

Patented June 8, 1915.

WITNESSES.
C. G. Bradley.
J. H. Thurston.

INVENTOR.
Martin A. O'Connor,
By Wilmarth H. Thurston,
ATTORNEY.

UNITED STATES PATENT OFFICE.

MARTIN A. O'CONNOR, OF PROVIDENCE, RHODE ISLAND, ASSIGNOR TO PROVIDENCE BLOWER COMPANY, OF PROVIDENCE, RHODE ISLAND, A CORPORATION OF RHODE ISLAND.

VARIABLE-SPEED GEAR.

1,142,051.  Specification of Letters Patent.  Patented June 8, 1915.

Application filed June 20, 1910. Serial No. 567,790.

*To all whom it may concern:*

Be it known that I, MARTIN A. O'CONNOR, of the city and county of Providence and State of Rhode Island, have invented certain new and useful Improvements in Variable-Speed Gears; and I do hereby declare the following specification, taken in connection with the accompanying drawings, forming a part of the same, to be a full, clear, and exact description thereof.

My invention relates to improvements in variable speed gears and is particularly designed and adapted for use in connection with my improved blower shown in my Patent No. 951,197, dated March 8, 1910, but it is also useful in other devices where a variable speed is desired.

The variable speed gears now in use, the most common of which are the elliptical gears, have certain objectionable features. In the first place with elliptical gears the work is not performed at a constant rate and there is a variable load upon the driving shaft. Furthermore, in the use of elliptical gears the work of acceleration is so variable and irregular that if the momentum is made great enough to keep the driven gear in contact with the driving gear at the point where the retardation is most rapid, the strain on the mechanism is so great as to cause excessive friction and liability of damage. In elliptical gears also the line of action of the teeth at certain points, especially during retardation of the driven gear, is very disadvantageous.

It is the object of my invention to obviate these objectionable features, and to this end the invention consists in providing a pair of variable speed gears which will perform the work at a constant rate, thereby placing a constant load upon the driving shaft.

It further consists in providing a pair of variable speed gears which will give both a constant and variable speed to the driven shaft.

It further consists in providing a pair of variable speed gears, the construction and operation of which is such that the work of acceleration can be accomplished while the work or load is light and at a rate which will make the total load upon the driving shaft constant.

It further consists in providing a pair of variable speed gears which are so constructed and arranged that one of said gears will make any predetermined number of revolutions while the other gear is making one revolution.

It further consists in the novel construction and arrangement of gears hereinafter described and more specifically set forth in the claims.

In describing the invention in detail reference will be made to the accompanying drawings in which—

Figure 2:
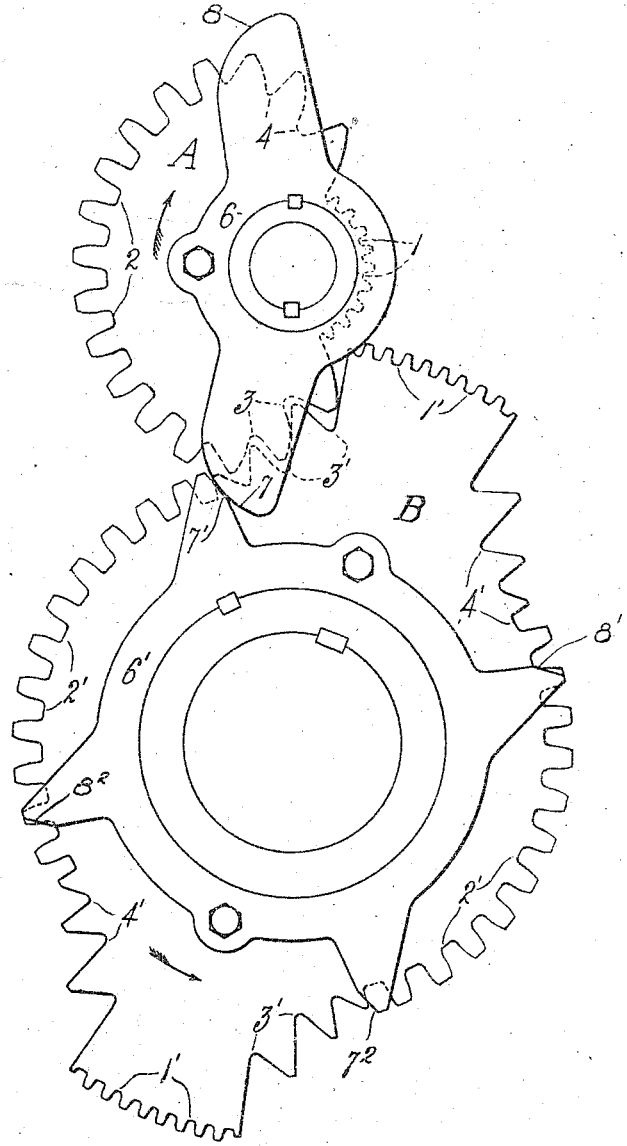

Figure 1 is a plan face view of my novel variable speed gears showing the same in mesh. Fig. 2 is a similar view of a modification.

Referring to the drawings, A represents the driving gear and B the driven gear. The driving gear A is provided with two concentric toothed arcs 1 and 2, respectively, of different radii which are arranged and adapted to mesh with two counterpart toothed arcs 1' and 2', respectively, on the driven gear B. The teeth on the concentric portions 1, 2, 1', and 2' may be of the standard involute or epicycloidal form or of any other desired form practical for spur gears. Connecting the two concentric toothed arcs 1 and 2 on the driving gear A are two eccentric toothed arcs 3 and 4, respectively. The teeth on the eccentric arcs 3 and 4 are cam-shaped and gradually increase in size, the smallest radius and the largest tooth being adjacent the concentric arc having the smallest radius. Connecting the two concentric toothed arcs 1' and 2' on the driven gear B are two counterpart eccentric toothed arcs 3' and 4', respectively. The teeth on the eccentric arcs 3' and 4' are cam-shaped and gradually decrease, the largest tooth being adjacent the concentric arc having the greatest radius and the smallest tooth being adjacent the concentric arc having the smallest radius.

The cam-shaped teeth on the eccentric portions 3, 4, 3' and 4' are designed to give the desired acceleration and retardation to the driven gear B. As shown in the drawings, the cam-shaped teeth on the driven gear B are formed with a straight radial face 5' and the coöperating cam-shaped teeth on the driving gear A are formed with a slightly curved face 5. With this construction a very strong tooth is produced and the line of action on the driven gear will be perpendicular to the radius thereof, and on the driving gear very nearly so, which results in a very efficient form of tooth.

With the above described form of gears, if the driving gear A is driven at a constant rate in the direction of its arrow, the driven gear B will be driven at a slow constant speed in the direction of its arrow, while the arcs 1 and 1' are in mesh; will be accelerated while the arcs 3 and 3' are in mesh; will be driven at a high constant speed while the arcs 2 and 2' are in mesh; and will be retarded while the arcs 4 and 4' are in mesh. As there are two sets of arcs 1', 2', 3', and 4' on the driven gear B, it will take two revolutions of the driving gear A to produce one revolution of the driven gear B and there will be two constant low speed periods, two constant high speed periods, two periods of acceleration, and two periods of retardation in each revolution of the driven gear.

It will be seen that during the period of retardation the cam-shaped teeth on the driving gear tend to move away from and out of mesh with the corresponding cam-shaped teeth on the driven gear. The inertia of the driven gear and its accessories, however, tend to keep said driving gear turning at a constant rate, and if the retarding action of the driving gear is greater than the retarding effect of the work imposed on the driven gear, and this is arranged for in the design of the cam-shaped teeth, the driven gear, by reason of its greater momentum, becomes for the time being the driving gear and its cam-shaped teeth remain in close contact with the corresponding teeth on the driving gear until the teeth on the concentric arcs of said gears come into mesh. If, however, the gears as above described should stop at a point when the driven gear is being retarded, then it would be impossible to again start the gears by reason of the fact that there would be no momentum to hold the cam-shaped teeth on the driven gear in engagement with the corresponding teeth on the driving gear and said gears would go out of mesh. To obviate this objectionable feature I provide the driving gear A with a cam-plate 6 secured to the face thereof and the driven gear B with a circular cam-plate 6' secured to its face, as shown in Fig. 2. The cam-plate 6 is provided with two oppositely disposed cams 7 and 8 which are constructed and arranged to coöperate with a series of cams 7', 8', 7², and 8² formed on the periphery of the cam-plate 6'. With this construction when the driven gear is being retarded the cam-face of cam 7 will engage with the cam-face of cam 7', and if there is any tendency for the driven gear to lag behind the driver, said cams will act to revolve said driven gear until the teeth on the concentric arcs mesh. So also if the gears stop while the driven gear is being retarded, said cams will act to rotate said driven gear until its momentum is sufficient to keep the gears in mesh during the period of retardation. The second set of cams 8 and 8' are provided to act when it is desired to reverse the rotation of the gears.

With my improved form of gears it will be seen that the driving gear will rotate twice while the driven gear is rotating once, and if desired the concentric arcs and the eccentric arcs may be increased in number on the driven gear so that three revolutions of the driving gear will be necessary to cause one revolution of the driven gear and there will then be three constant high speeds, three constant low speeds, three accelerations, and three retardations at each revolution of the driven gear. It will of course be understood that the gears may be reversed and the gear A be made the driven gear and the gear B the driving gear.

What I claim as my invention and desire to secure by Letters Patent is:

1. A variable speed gear having a concentric toothed arc and an eccentric toothed arc upon the periphery thereof.

2. A variable speed gear having a series of concentric toothed arcs and a series of eccentric toothed arcs, the teeth on the eccentric arcs being cam-shaped.

3. A variable speed gear having two concentric toothed arcs of different diameters and two eccentric toothed arcs connecting said concentric toothed arcs, the teeth on said eccentric toothed arcs being cam-shaped and of varying size.

4. A pair of variable speed gears comprising a driving gear and a driven gear, said gears being provided upon the periphery thereof with means whereby the driving gear will drive the driven gear at both constant and variable speeds.

5. A pair of variable speed gears comprising a driving gear and a driven gear, each of said gears having a high speed concentric toothed arc, a low speed concentric toothed arc, an eccentric toothed arc arranged and adapted to accelerate the speed of the driven gear, and an eccentric toothed arc arranged and adapted to retard the speed of said driven gear.

6. A pair of variable speed gears comprising a driving gear and a driven gear, each of said gears having a high speed concentric toothed arc, a low speed concentric toothed arc, an eccentric toothed arc for accelerating the speed of the driven gear, an eccentric toothed arc for retarding the speed of the driven gear, and means coöperating with each other to drive the driven gear during the retarding period.

7. A pair of variable speed gears comprising a driving gear and a driven gear, said gears being provided with means for rotating said driven gear at both constant and variable speeds, and separate means for driving said driven gear during the variable speed.

8. A pair of variable speed gears comprising a driving gear and a driven gear, said gears being provided with means for rotating the driven gear at a number of different constant speeds, a number of speeds of acceleration, and a number of speeds of retardation, and means for driving the driven gear during the periods of retardation.

9. A pair of variable speed gears comprising a driving gear and a driven gear, said driving gear being provided with two concentric toothed arcs, two eccentric toothed arcs and a cam overlying one of the eccentric arcs, and said driven gear being provided with a series of concentric toothed arcs, a series of eccentric toothed arcs, and a series of cams overlying said eccentric arcs and adapted to be engaged by and coöperate with the cam overlying the eccentric arc on the driving gear.

10. A pair of variable speed gears comprising a driving gear and a driven gear, said driving gear being provided with two concentric toothed arcs, two eccentric toothed arcs, and a cam-plate secured to one face thereof and having two cams, one of said cams overlying one of said eccentric arcs and the other of said cams overlying the other of said eccentric arcs, and said driven gear being provided with a series of concentric toothed arcs, a series of eccentric toothed arcs, and a cam-plate secured to one face thereof and having a series of cams overlying said eccentric arcs and adapted to be engaged by and coöperate with the cams overlying the eccentric arcs on the driving gear.

MARTIN A. O'CONNOR.

Witnesses:
W. H. THURSTON.
J. H. THURSTON.